UNITED STATES PATENT OFFICE.

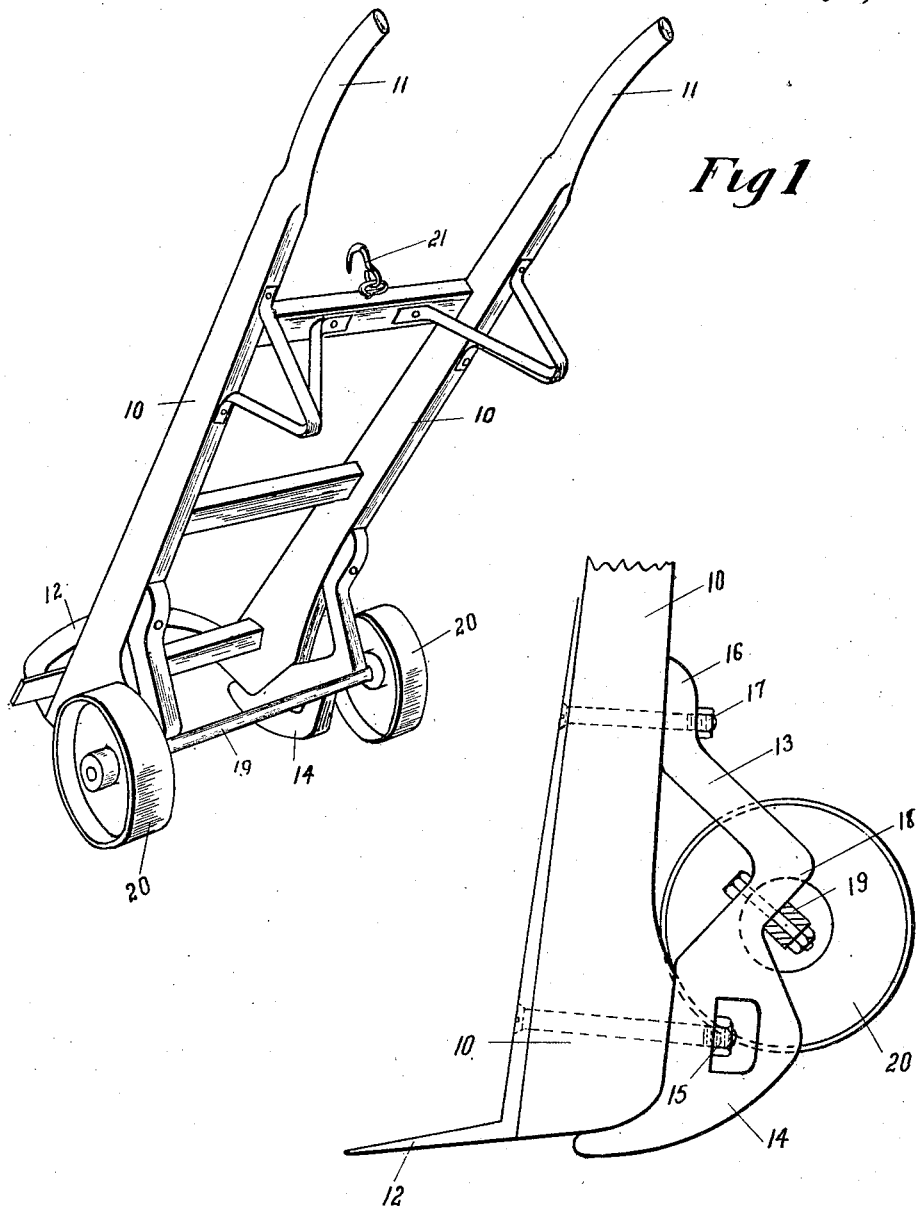

ARLON LITTLEFIELD, OF CRANSTON, RHODE ISLAND, ASSIGNOR TO NEW ENGLAND BUTT COMPANY, OF PROVIDENCE, RHODE ISLAND, A CORPORATION OF RHODE ISLAND.

TRUCK.

1,376,955.      Specification of Letters Patent.      Patented May 3, 1921.

Application filed September 29, 1919. Serial No. 327,091.

*To all whom it may concern:*

Be it known that I, ARLON LITTLEFIELD, a citizen of the United States, and resident of the city of Cranston, in the county of Providence and State of Rhode Island, have invented certain new and useful Improvements in Trucks, of which the following is a specification.

This invention relates to improvements in manually-operable trucks; and has for its object to provide simple and effective means to assist in raising a load from the floor onto the truck.

In the construction of trucks of this character the truck wheels are located some distance back from the lower end of the frame and when a particularly heavy load is to be lifted onto a truck it often requires the combined efforts of two or more men to raise it from the floor to a point over the wheels, by pressing downward the handles of the truck. To obviate this difficulty and to facilitate the lifting of this load, I have provided supporting bolsters having rocker portions which serve as a fulcrum member whereby the heaviest load may be easily raised and that by the effort of but a single person.

With these and other objects in view, the invention consists of certain novel features of construction, as will be more fully described, and particularly pointed out in the appended claims.

In the accompanying drawings:

Figure 1 is a perspective view showing the under side of a hand truck with my improved bolsters attached thereto.

Fig. 2 is a side elevation showing a portion of the frame of the truck in position to engage a load on the floor; also illustrating the rolling action truck in lifting the load from the floor to a point over the wheels.

Referring to the drawings, 10 designates the frame of a manually-operable truck which may be made in any of the usual or desired forms and of any suitable material, the upper ends of the frame members being shaped into operating handles 11; and at the lower end of this frame is mounted the usual nose iron 12.

On the back of each of the side bars of the frame I have attached a bolster 13, the lower edge 14 of which is made in a rounded or arcuate form of a rocker-shoe having its toe end extending around beneath the lower end of the frame intermediate the nose iron 12 and the wheels presently described, and is secured by the bolt 15. The upper or heel end 16 of each shoe extends along and some distance above the lower end of the frame and is secured thereto by bolt 17. To the angular shoulder portions 18 intermediate the ends of these bolsters I bolt the wheel axle 19 and on the opposite ends of this axle are mounted the truck wheels 20. The rocker-shaped end portions of these bolsters are positioned a short distance below a line drawn from the end of the nose iron and tangent to the lower periphery of the wheels, so that the truck rests upon these rockers when the handles of the truck are raised to substantially a vertical position in which position the truck wheels are carried by the rockers clear of the floor, as illustrated in Fig. 2.

In loading the truck the handles of the frame are placed in substantially vertical position, as illustrated in Fig. 2, and the nose iron 12 is inserted under the load which may be a box, barrel or other package or article. The handles are then carried backward causing the load to be raised or rolled upward on the rocker shoes until the wheels are brought down upon the floor at which time the load has been raised sufficiently to be carried by the wheels and a little farther downward tip or movement of the handles raises the shoes above the floor and the truck with its load is ready to be rolled away.

By the application of my improved bolsters to a truck of this character a load which heretofore on the ordinary truck required two persons to handle, may be easily manipulated by a single operator.

The device is extremely simple in construction and efficient in its operation.

It is also found in practice in the manipuation of standard-sized packages of a definite type such as tote boxes of uniform shape, which are used in different factories, that a hook 21 may be employed to good advantage for engaging the upper edge of a package, or even an eye secured to the package, so that the operator may use both of his hands on both of the operating handles 12 of the truck to exert his whole weight thereon and so roll the package on the rockers up over the wheels.

The foregoing description is directed solely toward the construction illustrated, but I desire it to be understood that I reserve the privilege of resorting to all the mechanical changes to which the device is susceptible, the invention being defined and limited only by the terms of the appended claims.

I claim—

1. A hand-truck comprising a frame having manipulating handles at its upper end and a laterally extending lifting nose at its lower end, a pair of bolsters secured to said lower end of the truck, one on each side thereof, each of said bolsters including a rocker shoe having an arcuate bearing surface, the toe portion of which extends around the lower end of the frame, whereby the latter rests thereupon, and the heel portion of which extends rearwardly and upwardly of the frame, each bolster further including an offset bracket positioned above and to the rear of said rocker shoe, an axle secured to the brackets of said bolsters, and traction wheels on said axle, said brackets being arranged to position said wheels so that the first contacting point of their periphery is at the heel portion of the rocker shoes.

2. A hand-truck comprising a frame having manipulating handles at its upper end and a laterally extending lifting nose at its lower end, a pair of bolsters secured to said lower end of the truck, one to each side thereof, each of said bolsters including a rocker shoe having an arcuate bearing surface, the toe portion of which extends around the lower end of the frame, whereby the latter rests thereupon, and the heel portion of which extends rearwardly and upwardly of the frame, each bolster further including an offset angular bracket positioned above and to the rear of said rocker shoe thereof and adapted to assume a substantially horizontal position when the truck is in its normally inclined transporting position, an axle secured to the under-surface of said brackets of said bolster, and traction wheels on said axle, said brackets being arranged to position said wheels so that the first contacting point of their periphery is at the heel portion of the rocker shoes, and said rocker shoes lying below a line extending from the end of said lifting nose and tangential to the lower periphery of said wheels.

In testimony whereof I affix my signature.

ARLON LITTLEFIELD.